United States Patent [19]

Hasegawa

[11] Patent Number: 4,982,205
[45] Date of Patent: Jan. 1, 1991

[54] LASER BEAM SCANNER IN WHICH THE LINE SCAN TIME IS MAINTAINED CONSTANT BY DECREASING THE ROTATING SPEED OF A SCANNING ELEMENT AS THE NUMBER OF REFLECTIVE FACETS THEREON INCREASES

[75] Inventor: Hirofumi Hasegawa, Osaka, Japan

[73] Assignee: Minolta Camera Kabushiki Kaisha, Osaka, Japan

[21] Appl. No.: 252,691

[22] Filed: Oct. 3, 1988

[30] Foreign Application Priority Data

Oct. 5, 1987 [JP] Japan .................. 62-251328

[51] Int. Cl.⁵ .................. G01D 15/14; B41J 2/47; G02B 26/08
[52] U.S. Cl. .................. 346/108; 350/6.7
[58] Field of Search .............. 358/296, 300; 346/108, 346/160, 107 R; 350/6.5, 6.7, 6.8; 235/467

[56] References Cited

U.S. PATENT DOCUMENTS

| 3,750,189 | 7/1973 | Fleischer . | |
|---|---|---|---|
| 3,804,485 | 4/1974 | Clarke | 350/6.8 |
| 3,818,444 | 6/1974 | Connell | 235/467 |
| 4,583,128 | 4/1986 | Anderson | 358/302 |

FOREIGN PATENT DOCUMENTS 11046 2/1975 Japan .

Primary Examiner—Bruce A. Reynolds
Assistant Examiner—Scott A. Rogers
Attorney, Agent, or Firm—Price, Gess & Ubell

[57] ABSTRACT

In a laser scanning apparatus, having a plurality of potential surfaces reflecting on a rotational member, not all the potential reflecting surfaces are effective to deflect a laser beam to a recording medium for forming an image on the recording medium. The ineffective surfaces are incapable of making an image even if a laser beam impinges thereon. The rotational member has a shape similar to a polygon mirror, thereby maintaining stable balance without generating an air noise during rotation. Only when a laser beam impinges the effective surfaces disposed partially around the rotational member does the laser beam get deflected onto a recording medium for periodically scanning the surface of the recording medium and thereby forming an image.

26 Claims, 2 Drawing Sheets

LASER BEAM SCANNER IN WHICH THE LINE SCAN TIME IS MAINTAINED CONSTANT BY DECREASING THE ROTATING SPEED OF A SCANNING ELEMENT AS THE NUMBER OF REFLECTIVE FACETS THEREON INCREASES

BACKGROUND OF THE INVENTION

1. Technical Field of the Invention

The present invention relates to a laser scanning apparatus in which a laser beam from a light source is scanned by a rotational scanning member such as a polygon mirror.

2. Brief Description of the Prior Art

In a laser scanning apparatus, a polygon mirror which is suitable for high speed scanning is being widely used as a scanning member, wherein all the polygonal surfaces are utilized as mirrors and are capable of successively scanning the number of times corresponding to the number of polygonal surfaces during a single rotation. The balance during rotation is maintained stably with the least generation of vibration and noise, and its high efficiency is most advantageously utilized in high speed scanning.

Heretofore, for instance, U.S. Pat. No. 3,750,189 proposes a method of correcting any irregularities in the planar surfaces of a polygon mirror, tilting of the surface of each mirror surface and the like by utilizing a lens system. However, it is unable to sufficiently rectify such problems as the tilting of surface and the like with such a structure. On the other hand, a highly accurate manufacturing process is required for manufacture of the polygon mirror, since the surface of the polygon mirror affects the quality of the image to be formed. In spite of such requirements, polygon mirrors provided with as many surfaces as 6 to 12 facets have conventionally been utilized with an extraordinary expensive cost which occupies most of the cost in an optical system of laser beam printers and the like.

However, utilization of a mirror with a few surfaces may also be taken into consideration. For instance, when the following conditions are set,

| | |
|---|---|
| System Speed | 30 mm/s |
| Writing Density | 300 dot/inch |
| Number of surfaces of polygon mirror | 6 | the number of revolutions necessary for the polygon mirror will be 3,543 r.p.m. However, this speed does not create a problem, since a drive motor used for a similar type polygon mirror is capable of sufficiently rotating the mirror for about 10,000 r.p.m., and the motor is available at the same cost. By increasing the number of revolutions of the polygon mirror within a range of the limit, the number of surfaces of the polygon mirror can be decreased, thereby lowering the total cost of an apparatus. Accordingly, polygon mirrors having 2 or 3 surfaces may also be utilized hypothetically.

However, with a decrease in the number of surfaces, the polygon mirror gradually becomes angular in shape. For instance, it becomes a triangle with 3 surfaces and a flat board with two surfaces, and it becomes difficult to cope with the noise of air generated at the time of high speed rotation. Moreover, the vibration increases when the mirror is moved, thereby affecting the quality of image and durability of the apparatus.

SUMMARY OF THE INVENTION

The main object of the present invention is to provide a laser scanning apparatus provided with a rotational scanning member that can be manufactured with high accuracy and with considerably reduced manufacturing cost.

Another object of the present invention is to provide a laser scanning apparatus provided with a rotational scanning member capable of rotating at high speed without vibration and noise of air.

A further object of the present invention is to a laser scanning apparatus provided with a rotational scanning member for accomplishing the above two objects by making, when a circumferential surface is made as virtual polygonal surfaces, one or a plurality of surfaces corresponding to a divisor of all surfaces of the rotational scanner the effective reflective surface which deflects a laser beam by directing to a recording medium for forming an image on the recording medium and the other as an ineffective reflective surface which is incapable of making image even if a laser beam is impacted thereon.

The other objects and features of the present invention will become more apparent from the following description taken in conjunction with the preferred embodiments thereof with reference to the accompanying drawings.

It is to be noted that like members and parts are designated by like reference marks throughout the accompanying drawings and that repeated description is omitted.

DETAILED DESCRIPTION OF THE INVENTION

Two representative embodiments of the present invention will now be described below.

Figure 1:
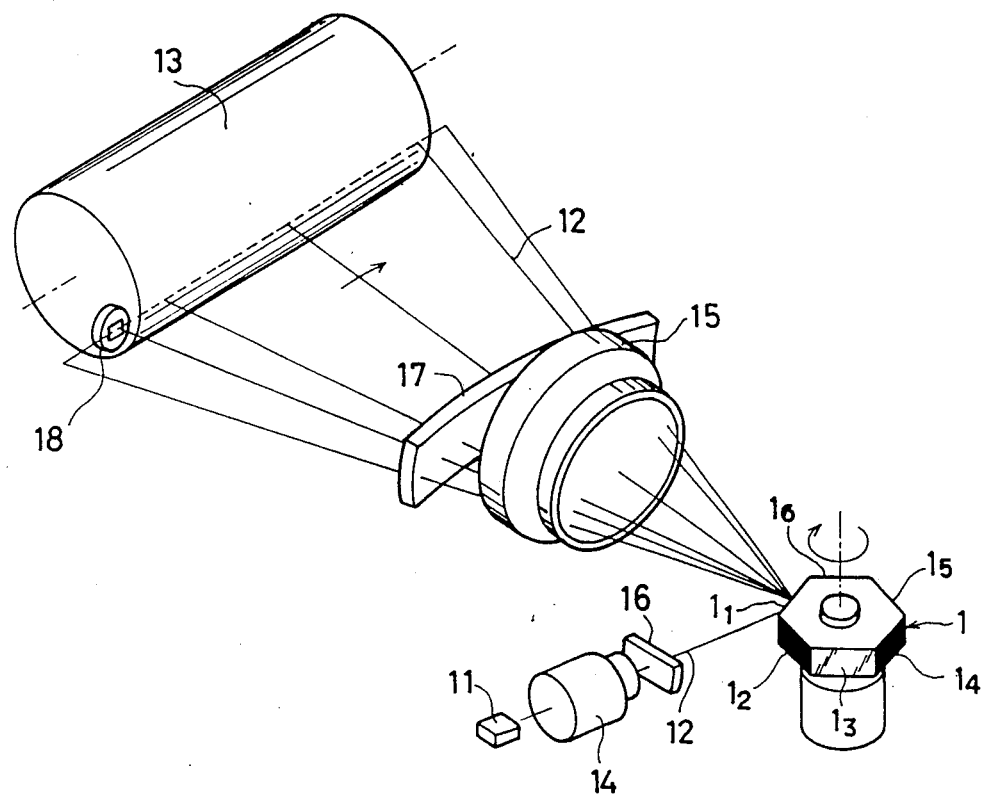
FIG. 1 is a schematic perspective view illustrating a laser beam printer in the first embodiment of the present invention.

FIG. 1 shows the first embodiment of the present invention. A rotational member 1 is provided with 6 polygonal surfaces, and every pitch of a plurality of surfaces corresponding to a divisor of all surfaces of the rotational scanner, i.e. the first surface $1_1$, the third $1_3$ and the fifth $1_5$, are made as effective reflective surfaces, thereby making the second surface $1_2$, the fourth $1_4$ and the sixth $1_6$ as ineffective reflective surfaces.

The effective surfaces $1_1$, $1_3$ and $1_5$ deflect a laser beam 12 received from a laser light sources 11 of a semiconductor laser and the like by directing to a recording medium 13 of a photoconductive drum and the like. The deflected laser beam 12 scans the surface of the recording medium 13 from one side to the other, corresponding to the rotation of the rotational member 1, thus forming an image. In order to form a high quality image, the effective surfaces $1_1$, $1_3$ and $1_5$ need to be highly accurately manufactured to be provided with a plane surface for eliminating any tilt of the surface.

In this embodiment, the laser beam 12 from the laser light source 11 is incident on the rotational member 1 through a collimator lens 14 and cylindrical lens 16. The incident laser beam is successively reflected on the effective surfaces $1_1$, $1_3$ and $1_5$ of the rotational member 1 and scans the recording medium 13 upon reaching thereat through f θ lens 15 and toroidal lens 17, which is a main scanning. On the other hand, the recording medium 13 is rotatively driven as a sub scanning. Accordingly, the recording medium 13 is scanned by the laser beam at the position gradually slipped off on each scanning, and a plane image is formed.

The cylindrical lens 16 is arranged to converge the laser beam 12 in a line on the rotational member 1 and the toroidal lens to restore the laser beam 12 reflected on the rotational member 1, and tilting of surface is rectified by disposing said lenses.

The tilting of the surface can be rectified according to the purpose of the present invention without the cylindrical lens 16 and the toroidal lens 17. However, by combining these lenses the tilting can be rectified more accurately and precisely. At one side of the recording medium 13 which is scanned by the laser beam 12, a light receiving portion 18 is arranged for emitting a signal to start scanning.

On the other hand, the ineffective surfaces $1_2$, $1_4$ and $1_6$ are incapable of making an image even if a laser beam is given thereon, and it will be sufficient if no noise is generated in the process of image formation. The ineffective surfaces $1_2$, $1_4$ and $1_6$ may, therefore, be arranged so as to avoid reflection of the laser beam 12 by coating them with black as shown in FIG. 1, or coating a filter which does not reflect the laser beam 12. It may also be arranged to diffuse the laser beam 12 as a diffusing surface in order not to affect an image forming procedure.

It may further be effective to provide an angle or configuration in such a way as to reflect the laser beam 12 outside an effective reflective light path leading to the recording medium 13. When reflection is made on the ineffective surfaces $1_2$, $1_4$ and $1_6$, it may be controlled not to emit a laser beam by turning off the laser light source 11. It is only necessary to have the laser beam 12 not to affect image formation, and therefore, no precise manufacturing process is required.

The rotational member 1 is made of six polygonal surfaces just the same as a conventional polygon mirror in shape and has an equal rotational characteristic without having any problem of vibration and a noise of air. Further, the number of effective surfaces which require the high accuracy of manufacturing process is reduced to ½ of the conventional mirror, thus reducing the manufacturing cost by half compared with the conventional polygon mirror.

The effective surfaces $1_1$, $1_3$ and $1_5$ of the rotational member 1 is formed on each pitch corresponding to a divisor of the polygonal surfaces. Each of the effective surfaces $1_1$, $1_3$ and $1_5$ successively passes periodically at a predetermined time the position where it receives the light of laser beam 12 by uniform rotation of the rotational member 1, thus scanning the surface of the recording medium 13 by the laser beam 12.

The scan is made intermittently, and therefore, the speed of image formation is delayed. However, the speed can be increased by decreasing the number of effective surfaces of the rotational member 1.

In this embodiment, the speed can be adjusted by making it double, since the effective surface of the polygonal surface is decreased to ½. In this case, modulation speed of the laser light source for image formation should also be made double, since the scanning speed is increased double. When the scanning speed is faster, the exposure time for the recording medium 13 becomes shorter. Therefore, the generating power of the laser beam 12 should be doubled for assuring sufficient exposure. In such a manner, the same quality image can be formed in the same speed as the one formed when all polygonal surfaces are utilized as effective surfaces.

In case there are six polygonal surfaces, two of the effective surfaces may be formed, for instance on the first surface $1_1$ and the fourth $1_4$, which are the pitch made by another divisor. Thereafter, by trebling the rotational speed, modulation speed, and generating power of the laser beam 12, the same quality image can be obtained in the same speed as the one formed when all polygonal surfaces are utilized as effective surfaces.

Further, without limiting the effective surface by the number of polygonal surface, even when the surface is one, the effective surface is able to perform scanning periodically at a predetermined time by uniform rotation of the rotational member 1. By increasing the rotational speed, modulation speed of the laser beam and generating power several times as many as the number of polygonal surfaces, the same quality image can be obtained in the same speed as the one formed when all polygonal surfaces are utilized as effective surface.

Figure 2:
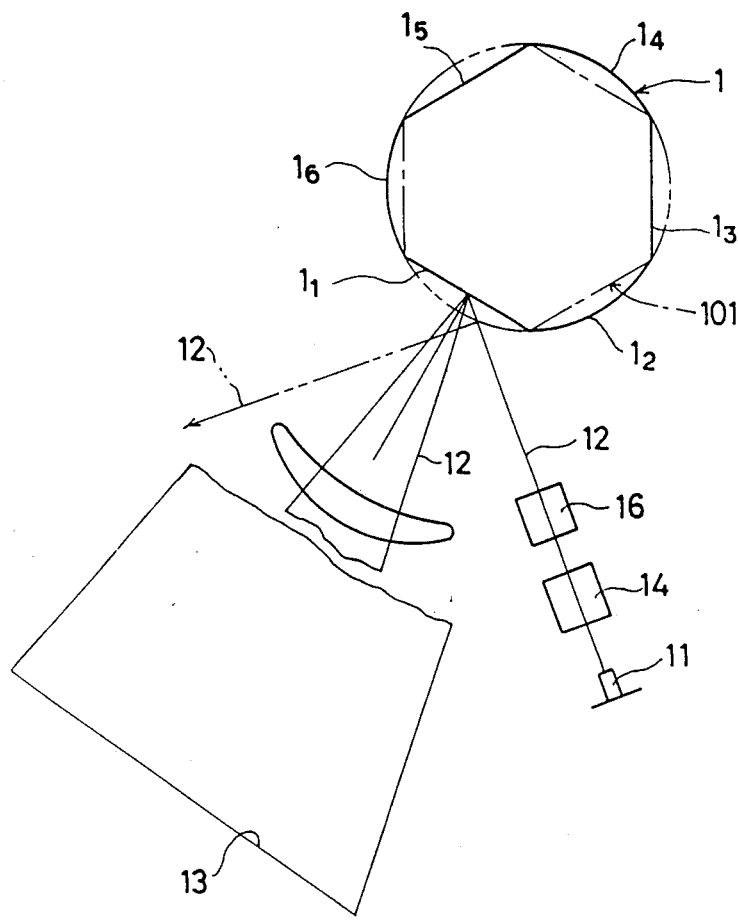
FIG. 2 is a schematic plan view showing a laser beam printer in the second embodiment of the present invention.

In FIG. 2, the same number of effective surfaces $1_1$, $1_3$ and $1_5$ as in the first embodiment of the present invention are formed in a rotational member 1, and ineffective surfaces $1_2$, $1_4$ and $1_6$ positioned between the effective surfaces are made in the shape of a circular arc circumscribed with a virtual polygonal surface 101 which includes the effective surfaces $1_1$, $1_3$ and $1_5$.

In this embodiment, formation of a rotational member 1 can be easily accomplished by scraping off in plane the portions of effective surfaces $1_1$, $1_3$ and $1_5$ only from a cylindrical member, thus simplifying the manufacturing process. Thus, considerable reduction in manufacturing cost can be attained by decreasing the effective surface.

The ineffective surfaces $1_2$, $1_4$ and $1_6$ in FIG. 2 are formed in a circular arc, and therefore, they reflect the laser beam 12 to some degree. However, the direction of reflection is directed to outside the light path of the effective surface leading to a recording medium 13 as shown by a phantom line and function as an ineffective surface. No special manufacturing process is thus required.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A laser scanning apparatus comprising:
    a laser beam generating means for generating a laser beam;
    an object surface on which the laser beam is scanned;
    a first rotational scanning means for reflecting the laser beam incident from said laser beam generating means, said first rotational scanning means having one or more effective surfaces capable of reflecting the laser beam onto said object surface and one or more ineffective surfaces incapable of causing the laser beam to reach said object surface, said effective surfaces being a number corresponding to a divisor of all surfaces of said first rotational scanning means; and a driving means for rotating the first rotational scanning means such that a transit time of a successive scanning line caused by the first rotational scanning means is substantially equal to a transit time of a scanning line which would be caused by a second rotational scanning means having effective surfaces corresponding to the total surfaces of the first rotational scanning means.

2. A laser scanning apparatus as defined in claim 1, wherein said ineffective surfaces do not reflect the laser beam incident from said laser beam generating means.

3. A laser scanning apparatus as defined in claim 1, wherein said ineffective surfaces diffuse the laser beam incident from said laser beam generating means.

4. A laser scanning apparatus as defined in claim 1, wherein said first rotational scanning means includes a polygonal member having one or more effective surfaces capable of reflecting the laser beam onto said object surface and one or more ineffective surfaces incapable of causing the laser beam to reach said object surface, said effective surfaces being a number corresponding to a divisor of all surfaces of said first rotational scanning means.

5. A laser scanning apparatus comprising:
a laser beam generator for generating a laser beam;
an object surface on which the laser beam is scanned;
a first rotational scanner for reflecting the laser beam incident from said laser beam generator, said first rotational scanner having one or more effective surfaces capable of reflecting the laser beam onto said object surface and one or more ineffective surfaces having a circular shape incapable of causing the laser beam to reach said object surface, said effective surfaces being a number corresponding to a divisor of all surfaces of said first rotational scanner, and
a motor for rotating the first rotational scanner such that a transit time of a successive scanning line caused by the first rotational scanner is substantially equal to a transit time of a scanning line caused by a second rotational scanner which would be arranged to have effective surfaces corresponding to the total surfaces of the first rotational scanner.

6. A laser scanning apparatus as defined in claim 1, wherein said driving means rotates said first rotational scanning means at a speed faster than the speed of a second rotational scanning means which would be arranged to have effective surfaces corresponding to the total surfaces of the first rotational scanning means.

7. A laser recording apparatus comprising:
a laser beam generating means for generating a laser beam modulated according to image data;
a recording medium on which the modulated laser beam is scanned for recording;
a first rotational scanning means for reflecting the laser beam incident from said laser beam generating means, the first rotational scanning means having one or more effective surfaces capable of reflecting the laser beam onto said recording medium and one or more ineffective surfaces incapable of causing the laser beam to reach said recording medium, said effective surfaces being a number corresponding to a divisor of all surfaces of the first rotational scanning means; and a driving means for rotating the first rotational scanning means such that a transit time of a scanning line caused by the first rotational scanning means is substantially equal to a transit time of a scanning line which would be caused by a second rotational scanning means which would be arranged to have a number of effective surfaces corresponding to the total surfaces of the first rotational scanning means.

8. A laser recording apparatus as defined in claim 7, wherein said ineffective surfaces do not reflect the laser beam incident from said laser beam generating means.

9. A laser recording apparatus as defined in claim 7, wherein said ineffective surfaces diffuse the laser beam incident from said laser beam generating means.

10. A laser recording apparatus as defined in claim 7, wherein the first rotational scanning means includes a polygonal member having one or more effective surfaces capable of reflecting the laser beam onto said object surface and one or more ineffective surfaces incapable of causing the laser beam to reach said object surface, said effective surfaces being a number corresponding to a divisor of all surfaces of the first rotational scanning means.

11. A laser recording apparatus comprising:
a laser beam generator wherein the beam is modulated according to image data;
a recording medium on which the modulated laser beam is scanned for recording;
a first rotational scanner for reflecting the laser beam incident from said laser beam generator, said first rotational scanner having one or more effective surfaces capable of reflecting the laser beam onto said recording medium and one or more ineffective surfaces having a circular shape incapable of causing the laser beam to reach said recording medium, said effective surfaces being a number corresponding to a divisor of all surfaces of the first rotational scanner, and
a motor for rotating the first rotational scanner such that a transit time of a scanning line caused by the first rotational scanner is substantially equal to a transit time of a scanning line caused by a second rotational scanner which would be arranged to have effective surfaces corresponding to the total surfaces of the first rotational scanner.

12. A laser recording apparatus as defined in claim 7, wherein said driving means rotates the first rotational scanning means at a speed faster than the speed of the second rotational scanning means which would be arranged to have effective surfaces corresponding to the total surfaces of the first rotational scanning means.

13. A rotational scanning member for use in a laser scanning apparatus wherein a laser beam generated from a light source is reflecting by the rotational scanning member and scanned onto an object surface, said rotational scanning member having one or more effective surfaces capable of reflecting the laser beam onto said object surface and one or more ineffective surfaces having a circular shape incapable of causing the laser beam to reach said object surface, said effective surfaces being a number corresponding to a divisor of all surfaces of said rotational scanning member.

14. A rotational scanning member as defined in claim 13, wherein said rotational scanning member includes a polygonal member having one or more effective surfaces capable of reflecting the laser beam onto said object surface and one or more ineffective surfaces incapable of causing the laser beam to reach said object surface, said effective surfaces being a number corresponding to a divisor of all surfaces of said rotational scanning member.

15. A laser recording apparatus as defined in claim 11, wherein said laser beam generator modulates the laser beam at a first modulation speed for the first rotational scanner, said first modulation speed being faster than a second modulation speed for said second rotational scanner.

16. A laser recording apparatus as defined in claim 11, wherein said laser beam generator emits the laser beam at a first generating power for the first rotational scanner, said first generating power being greater than a second generating power for the second rotational scanner.

17. A laser recording apparatus comprising:
   a laser beam generating means for generating a laser beam modulated according to image data;
   a recording medium on which the modulated laser beam is scanned for recording;
   a first rotational scanning means for reflecting the laser beam incident from said laser beam generating means, the first rotational scanner having one or more effective surfaces capable of reflecting the laser beam onto said recording medium and one or more ineffective surfaces incapable of causing the laser beam to reach said recording medium, said effective surfaces being a number corresponding to 1/N of all surfaces of the first rotational scanning means, said N being a number corresponding to the divisor of all surfaces of the first rotational scanning means, and
   a driving means for rotating the first rotational scanning means at a speed which is N times as fast as that for a second rotational scanning means which would be arranged to have effective surfaces corresponding to the total surfaces of the first rotational scanning means.

18. A laser recording apparatus as defined in claim 17, wherein said laser beam generating means modulates the laser beam at a first modulation speed for the first rotational scanning means, said first modulation speed being N times as fast as a second modulation speed for said second rotational scanning means.

19. A laser recording apparatus as defined in claim 18, wherein said laser beam generating means emits the laser beam at a first generating power for the first rotational scanning means, said first generating power being N times as much as a second generating power for said second rotational scanning means.

20. A laser recording apparatus as defined in claim 17, wherein said ineffective surfaces have a circular shape.

21. A laser recording apparatus as defined in claim 17, wherein said ineffective surfaces do not reflect the laser beam incident from said laser generating means.

22. A laser recording apparatus as defined in claim 17, wherein said ineffective surfaces diffuse the laser beam incident from said laser generating means.

23. A laser scanning apparatus comprising:
   a laser beam generating means wherein a laser beam is modulated according to image data;
   an object surface on which the laser beam is scanned;
   a first rotational scanning member for reflecting the laser beam incident from said laser generating means, said first rotational scanning member having one or more effective surfaces capable of reflecting the laser beam onto said object surface and one or more ineffective surfaces incapable of causing the laser beam to reach said object surface, each of said ineffective surfaces having a circular shape, said effective surfaces being a number corresponding to a divisor of all surfaces of said first rotational scanning member, and
   a driving means for rotating the first rotational scanning member.

24. A laser scanning apparatus as defined in claim 23, wherein said driving means rotates the first rotational scanning member at a first speed which is faster than a second speed for a second rotational scanning member which would be arranged to have effective surfaces corresponding to the total surfaces of the first rotational scanning member.

25. A laser scanning apparatus as defined in claim 24, wherein said laser beam generating means modulates the laser beam at a first modulation speed for the first rotational scanning means, said first modulation speed being faster than a second modulation speed for the second rotational scanning means.

26. A laser scanning apparatus as defined in claim 24, wherein said laser beam generating means emits the laser beam at a first generating power for the first rotational scanner, said first generating power being stronger than a second generating power for the second rotational scanner.

* * * * *